US012804793B2

(12) United States Patent
Zhang et al.

(10) Patent No.: US 12,804,793 B2
(45) Date of Patent: Nov. 17, 2026

(54) SURFACE COUPLING INDUCED IONIZATION TECHNIQUE AND ITS CORRESPONDING PLASMA AND PLASMA DEVICES

(71) Applicant: High-dimensional Plasma Sources Technology (Xiaogan) Co., Ltd, Xiaogan City (CN)

(72) Inventors: Linde Zhang, Xiaogan City (CN); Xiangjun Yan, Xiaogan City (CN)

(73) Assignee: High-dimensional Plasma Sources Technology (Xiaogan) Co., Ltd, Xiaogan City (CN)

( * ) Notice: Subject to any disclaimer, the term of this patent is extended or adjusted under 35 U.S.C. 154(b) by 1057 days.

(21) Appl. No.: 17/921,723

(22) PCT Filed: May 9, 2020

(86) PCT No.: PCT/CN2020/089346
§ 371 (c)(1),
(2) Date: Oct. 27, 2022

(87) PCT Pub. No.: WO2021/226741
PCT Pub. Date: Nov. 18, 2021

(65) Prior Publication Data
US 2023/0171870 A1 Jun. 1, 2023

(51) Int. Cl.
*H05H 1/46* (2006.01)

(52) U.S. Cl.
CPC .................................... *H05H 1/46* (2013.01)

(58) Field of Classification Search
CPC .......... H05H 1/24; H05H 1/2439; H05H 1/30; H05H 1/46; H05H 1/461; H05H 1/4615; H05H 1/4645
See application file for complete search history.

(56) References Cited

U.S. PATENT DOCUMENTS 6,362,449 B1 3/2002 Hadidi et al.
2004/0112541 A1* 6/2004 Ishii .................. H01J 37/32192 156/345.41
(Continued)

FOREIGN PATENT DOCUMENTS

CN 1331502 A * 1/2002
CN 1653866 A 8/2005
(Continued)

OTHER PUBLICATIONS

Grote et al., Surface Plasmon Resonance/Mass Spectrometry Interface, Feb. 15, 2005, Analytical Chemistry, vol. 77, p. 1157-1162 (Year: 2005).*
(Continued)

*Primary Examiner* — Hung D Nguyen

(57) ABSTRACT

Provided are a surface coupling induced ionization method, and a plasma device. The method includes the following steps: (1) feeding a first electromagnetic wave beam to a material via a free space or waveguide to excite surface plasma waves; where target molecules to be ionized are introduced to a surface of the material, and electrons of the target molecules are coupled with surface plasmons on the material under interaction control to induce the ionization of the target molecules; (2) feeding second and subsequent electromagnetic wave beams to an ionization area of the target molecules on the surface of the material synchronously via the free space or waveguide, such that the ionized target molecules absorb the electromagnetic waves to improve the degree of ionization of the target molecules; and (3) releasing the target molecules in the form of bulk phase plasma to realize surface coupling induced ionization.

59 Claims, 2 Drawing Sheets

(56) References Cited

U.S. PATENT DOCUMENTS

| | | | | |
|---|---|---|---|---|
| 2006/0078675 | A1* | 4/2006 | Kumar | C23C 16/50<br>427/532 |
| 2008/0266567 | A1* | 10/2008 | Skorobogatiy | B82Y 20/00<br>356/445 |
| 2010/0130911 | A1* | 5/2010 | Morfill | A61L 2/14<br>606/41 |

FOREIGN PATENT DOCUMENTS

| | | | | | |
|---|---|---|---|---|---|
| CN | 1663326 | A | | 8/2005 | |
| CN | 101022912 | A | | 8/2007 | |
| CN | 105072793 | A | | 11/2015 | |
| CN | 109546319 | A | * | 3/2019 | H01Q 1/12 |
| CN | 111479375 | A | | 7/2020 | |
| JP | H10-135705 | A | * | 5/1998 | B23K 26/53 |
| JP | 2006208379 | A | * | 8/2006 | H01J 49/0477 |

OTHER PUBLICATIONS

International search report of PCT/CN2020/089346.

* cited by examiner

SURFACE COUPLING INDUCED IONIZATION TECHNIQUE AND ITS CORRESPONDING PLASMA AND PLASMA DEVICES

TECHNICAL FIELD

The present invention relates to the fields of material science and electronic devices, in particular to plasma and ionization. In addition, the present invention also relates to a series of plasma devices related to the plasma.

BACKGROUND

Plasma is a state of matter formed by further ionization of gaseous molecules under the action of an external field or heat. Plasmas are commonly seen in our daily life, including high-temperature flames in a burning environment, electric arcs formed when high-voltage discharge breaks through the air, and neon lights on the street. Ionization, a technique of converting gaseous molecules into plasma, is widely used in various fields such as treatment of waste water, waste gas and solid waste, rubber recovery, material synthesis and surface modification, and detection and analysis.

Plasmas with different forms have different ionization conditions. The most common form is plasma formed under negative pressure or vacuum. One of the typical ionization methods under vacuum or negative pressure is glow discharge. A glow discharge is a glow plasma formed by forming a certain negative pressure (generally lower than 10 mbar) in a tube filled with one of noble gases and then two plate electrodes discharging into the vacuum tube to ionize the gas. By replacing a direct current with a high-frequency jet, radio-frequency plasma based on capacitive coupling between the plate electrodes can be further obtained. Traditional plasmas under negative pressure or vacuum also include corona discharge, arc breakdown discharge, dielectric barrier discharge, etc., most of which require a negative-pressure environment.

The vacuum or negative-pressure environment often limits the application of plasma, so a great deal of research has been made on how to realize ionization under atmospheric pressure. Common atmospheric-pressure ionization techniques include electron bombardment ionization, radio-frequency ionization, arc ionization, inductive coupling ionization, electrospray ionization, laser-induced ionization and so on. Here, the main methods used to form atmospheric-pressure plasma are arc ionization and inductive coupling ionization. Atmospheric-pressure plasmas obtained by these two methods are widely used in various fields, including garbage disposal, material smelting, surface coating and instrument analysis, etc., and have achieved fruitful results in certain applications. For example, an arc plasma torch has been used as the most effective tool for treatment of waste with complex components, and an inductively coupled plasma torch (ICP)-optical emission spectrometer (ICP-OES) or ICP-mass spectrometry system (ICP-MS) is the most common key instrument for detecting the content of various elements, of which the detection limit can reach a ppb or ppt level. For an atmospheric-pressure plasma, the possibility of its application depends on the adjustable range of electron temperature and ion temperature of the plasma, specifically on the adjustable range of energy density in the plasma. The value of its application depends on the energy feeding efficiency when the plasma is formed.

The biggest problem of the commercial application of atmospheric-pressure plasma is low energy feeding efficiency. For example, for an arc plasma, once an arc is formed, the voltage across an electrode will drop rapidly, resulting in a decrease of energy density in the plasma. For an inductively coupled plasma, spark ignition is always needed to form an initial gas ionization part, so that energy can be fed into ionized gas to further form a torch through alternating magnetic field coupling established in an AC coil, which makes the impedance characteristics of the plasma itself become the object that directly affects the coupling efficiency.

To sum up, a new ionization technique is always desired in this field, which can produce atmospheric-pressure plasma with higher energy feeding efficiency, wider adjustable range of electron temperature and ion temperature, and higher energy density, thus deepening current applications and exploring other applications.

SUMMARY

Technical Problem

In view of this, the present invention proposes a surface coupling induced ionization technique with superior performance, and a plasma and plasma device corresponding thereto.

Solutions to Problems

Technical Solution

In one aspect, the present invention provides a surface coupling induced ionization method, including the following steps.

A first electromagnetic wave beam is fed to a material via a free space or waveguide, such that the first electromagnetic wave beam resonates with surface plasma of the material and surface plasma waves are excited. At the same time, target molecules to be ionized are introduced to a surface of the material, and by controlling the interaction between the surface of the material and the target molecules, electrons of the target molecules are coupled with surface plasmon on the material to induce the ionization of the target molecules. Second and subsequent electromagnetic wave beams are fed to an ionization area of the target molecules on the surface of the material synchronously via the free space or waveguide, such that the ionized target molecules absorb the electromagnetic waves to improve the degree of ionization of the target molecules. Finally, the target molecules are released in the form of bulk phase plasma to realize surface coupling induced ionization.

Further, the material is in a solid form or a liquid form. Here, the solid form includes at least one of film, particle, powder, aerosol, photonic crystal and gas-solid two-phase flow; and the liquid form includes at least one of droplet, dispersion liquid and gas-liquid two-phase flow.

Further, the material has a size of 0.3 nm-1000 mm.

Further, the material includes at least one of metal and alloy material, carbon material, ceramic material, organic conductor material and semiconductor material.

Further, the metal and alloy material includes metal or alloy containing at least one of lithium, beryllium, boron, carbon, sodium, magnesium, aluminum, silicon, phosphorus, sulfur, scandium, titanium, vanadium, chromium, manganese, iron, cobalt, nickel, copper, zinc, gallium, germanium, arsenic, rubidium, strontium, yttrium, zirconium, niobium, molybdenum, technetium, ruthenium, rhodium, palladium, silver, cadmium, indium, tin, antimony, tellurium, cesium, barium, hafnium, tantalum, tungsten, rhenium, osmium, iridium, platinum, gold, mercury, thallium, lead, bismuth, polonium, francium, radium, lanthanide elements and actinide elements.

Further, the carbon material includes at least one of graphene, aminated graphene, carboxylated graphene, hydroxylated graphene, sulfhydrylated graphene, oxidized graphene, methylated graphene, trifluoromethylated graphene, octadecylated graphene, fluorinated graphene and iodinated graphene, artificial graphite, natural graphite, graphitized carbon microsphere, graphitized carbon nanotube, carbon nanotube, glassy carbon, amorphous carbon, carbon nanohorn, carbon fiber, carbon quantum dot and carbon molecular sieve.

Further, the ceramic material includes at least one of oxide ceramic, silicate ceramic, nitride ceramic, borate ceramic, phosphate ceramic, carbide ceramic, aluminate ceramic, germanate ceramic and titanate ceramic.

Further, the organic conductor material includes at least one of polyacetylene, polyarylacetylene, polypyrrole, polyaniline, polythiophene, polyphenylene sulfide, TTF-TCNQ, PEDOT-PSS, tetrathiafulvalene, polyfluorene, poly (p-phenylene), polyaromatic hydrocarbon and other compounds with a continuous conjugated skeleton.

Further, the semiconductor material includes at least one of III-V semiconductor, II-VI semiconductor, IV semiconductor, quantum dot semiconductor and perovskite semiconductor particle.

Further, the first electromagnetic wave beam is at least one of gamma-ray, hard X-ray, soft X-ray, extreme ultraviolet ray, near-ultraviolet ray, visible light, near-infrared ray, middle infrared ray, far infrared ray, terahertz wave, extremely-high frequency microwave, super-high frequency microwave, ultra-high frequency microwave, very high frequency radio wave, high frequency radio wave, intermediate frequency radio wave, low frequency radio wave, very low frequency radio wave, ultra-low frequency radio wave, and extremely-low frequency radio wave.

Further, the first electromagnetic wave beam has a wavelength ranging from 0.01 nm to 100 km.

Further, the spatial distribution of the first electromagnetic wave beam includes at least one of Gaussian beam, Bessel beam, Airy beam, Laguerre-Gaussian beam, Cosine-Gaussian beam, Mathieu beam, flat-topped beam and vortex beam.

Further, the first electromagnetic wave beam has a degree of polarization of 0.01%-99%.

Further, the polarization mode of the first electromagnetic wave beam includes at least one of natural light, partial polarization, linear polarization, circular polarization, elliptical polarization, azimuthal polarization and radial polarization.

Further, the polarization of the first electromagnetic wave beam includes S-wave polarization and P-wave polarization.

Further, the first electromagnetic wave beam has an orbital angular momentum ranging from −10 to +10.

Further, the first electromagnetic wave beam has a phase ranging from 0π to 2π.

Further, the second and subsequent electromagnetic wave beams are at least one of gamma-ray, hard X-ray, soft X-ray, extreme ultraviolet ray, near-ultraviolet ray, visible light, near-infrared ray, middle infrared ray, far infrared ray, terahertz wave, extremely-high frequency microwave, super-high frequency microwave, ultra-high frequency microwave, very high frequency radio wave, high frequency radio wave, intermediate frequency radio wave, low frequency radio wave, very low frequency radio wave, ultra-low frequency radio wave, and extremely-low frequency radio wave.

Further, the second and subsequent electromagnetic wave beams have a wavelength ranging from 0.01 nm to 100 km.

Further, the spatial distribution of the second and subsequent electromagnetic wave beams includes at least one of Gaussian beam, Bessel beam, Airy beam, Laguerre-Gaussian beam, Cosine-Gaussian beam, Mathieu beam, flat-topped beam and vortex beam.

Further, the second and subsequent electromagnetic wave beams have a degree of polarization of 0.01%-99%.

Further, the polarization mode of the second and subsequent electromagnetic wave beams includes at least one of natural light, partial polarization, linear polarization, circular polarization, elliptical polarization, azimuthal polarization and radial polarization.

Further, the polarization of the second and subsequent electromagnetic wave beams includes S-wave polarization and P-wave polarization.

Further, the second and subsequent electromagnetic wave beams have an orbital angular momentum ranging from −10 to +10.

Further, the second and subsequent electromagnetic wave beams have a phase ranging from 0π to 2π.

Further, the target molecules have a molecular weight ranging from $1.0\times10^{0}$ Da to $1.0\times10^{20}$ Da.

Further, feeding the first electromagnetic wave beam to the material via a free space specifically includes the following steps: 1S1, modulating the wavelength and its range, spatial distribution, polarization, orbital angular momentum and its range, phase and its range of the first electromagnetic wave beam to obtain a first modulated electromagnetic wave beam; 1S2*a*, guiding the first modulated electromagnetic wave beam to be subjected to wave vector matching with surface plasma frequency of the material to obtain wave vector-matched modulated electromagnetic waves; and 1S3*a*, directing the wave vector-matched modulated electromagnetic waves onto the surface of the material via the free space, such that surface plasma waves are formed on the surface of the material.

Further, a method for modulating the wavelength and its range in step 1S1 includes at least one of chromatic dispersion device modulation, filter device modulation, refraction device modulation, interference modulation, absorption modulation, nonlinear optical modulation and resonant cavity enhancement modulation.

Further, a method for modulating the spatial distribution in step 1S1 includes at least one of refraction device modulation, transmission antenna modulation, matrix reflection device modulation, spatial light modulator modulation, variable curvature reflection device modulation and absorption device modulation.

Further, a method for modulating the polarization and the orbital angular momentum and its range in step 1S1 includes at least one of single-mode cavity modulation, photoelastic modulation, spatial light modulator modulation, mode converter modulation, birefringent device modulation and polarizer modulation.

Further, a method for modulating the phase and its range in step 1S1 includes at least one of phase shift modulation, birefringence device modulation and spatial light modulator modulation.

Further, a method for wave vector matching in step 1S2*a* includes using at least one of a grating, a photonic crystal, free optical coupling prism total internal reflection, a metamaterial device with dielectric constant less than 1, a multiple attenuation total internal reflection device, a free optical coupling waveguide total internal reflection device, a total internal reflection device, a focusing device and direct matching.

Further, feeding the first electromagnetic wave beam to the material via a waveguide specifically includes the following steps: 1S1, modulating the wavelength and its range, spatial distribution, polarization, orbital angular momentum and its range, phase and its range of the first electromagnetic wave beam to obtain a first modulated electromagnetic wave; 1S2*b*, feeding the first modulated electromagnetic wave beam into an isolator via the waveguide to obtain a unidirectional first modulated electromagnetic wave beam; 1S3*b*, guiding the unidirectional first modulated electromagnetic wave beam to be subjected to wave vector matching with surface plasma frequency of the material to obtain wave vector-matched unidirectional modulated electromagnetic waves; and 1S4*b*, directing the wave vector-matched unidirectional modulated electromagnetic waves onto the surface of the material via the waveguide, such that surface plasma waves are formed on the surface of the material.

Further, the isolator in step 1S2*b* includes at least one of waveguide circulator, optical fiber waveguide circulator, optical fiber photoisolator, Faraday rotator, coaxial isolator, drop-in isolator, broadband isolator, two-section isolator, microstrip isolator, attenuator and load.

Further, a method for wave vector matching in step 1S3*b* includes using at least one of a grating, a photonic crystal waveguide, waveguide coupling prism total internal reflection, a metamaterial waveguide with dielectric constant less than 1, a multiple attenuation total internal reflection device, a waveguide total internal reflection device, a total internal reflection device, near-field waveguide probe irradiation with wavelength less than 1, and direct matching.

Further, introducing the target molecules to be ionized to the surface of the material specifically includes the following steps: 2S1, introducing the target molecules into a gas phase environment to obtain target molecules in a gas phase; and 2S2, moving the target molecules in the gas phase to the surface of the material.

Further, a method for introducing the target molecules into the gas phase environment in step 2S1 includes at least one of ultrasonic atomization, heating evaporation, vacuum gasification, direct gasification and airflow carrying.

Further, moving to the surface of the material in step 2S2 includes at least one of optical tweezers displacement, ultrasonic tweezers displacement, mechanical force displacement, airflow loading, vacuum suction displacement, probe traction displacement and magnetic force displacement.

Further, controlling the interaction between the surface of the material and the target molecules specifically includes the following steps: 3S1, controlling the microstructure of the material and surface electromagnetic field distribution to obtain a modulated material; 3S2, controlling the state of the target molecules to obtain modulated target molecules; and 3S3, combining the modulated material with the modulated target molecules to control the interaction between the surface of the material and the target molecules, and realize the ionization of the target molecules.

Further, controlling the microstructure of the material and surface electromagnetic field distribution in step 3S1 includes at least one of forming a nano-scale periodic microstructure on the surface of the material, forming a nano-scale aperiodic microstructure on the surface of the material, forming a micrometer-scale periodic microstructure on the surface of the material, forming a micrometer-scale aperiodic microstructure on the surface of the material, material surface functional group structure modulation, material surface defect state density structure modulation, material surface doping structure modulation, material crystal domain size modulation, material superlattice structure modulation, material surface voltage modulation, material surface electric field distribution modulation, material magnetic domain structure modulation, and material magnetic field modulation.

Further, controlling the state of the target molecules in step 3S2 includes at least one of exciting the target molecules by electromagnetic waves to select different excited states, controlling the chemical potential of the target molecules on the material by concentration difference, charging the target molecules by electrostatic introduction, and magnetizing the target molecules by magnetic field introduction.

Further, feeding the second and subsequent electromagnetic wave beams to the ionization area of the target molecules on the surface of the material via a free space specifically includes the following steps: 4S1, modulating the wavelength and its range, spatial distribution, polarization, orbital angular momentum and its range, phase and its range of the second and subsequent electromagnetic wave beams to obtain second and subsequent modulated electromagnetic wave beams; 4S2, guiding the second and subsequent modulated electromagnetic wave beams to match with the plasma frequency of the ionized target molecules, so as to obtain frequency-matched modulated electromagnetic waves; and 4S3*a*, directing the frequency-matched modulated electromagnetic waves onto the ionization area of the target molecules on the surface of the material via the free space, such that the ionized target molecules absorb the electromagnetic waves to improve the degree of ionization of the target molecules.

Further, a method for modulating the wavelength and its range in step 4S1 includes at least one of chromatic dispersion device modulation, filter device modulation, refraction device modulation, interference modulation, absorption modulation, nonlinear optical modulation and resonant cavity enhancement modulation.

Further, a method for modulating the spatial distribution in step 4S1 includes at least one of refraction device modulation, transmission antenna modulation, matrix reflection device modulation, spatial light modulator modulation, variable curvature reflection device modulation and absorption device modulation.

Further, a method for modulating the polarization and the orbital angular momentum and its range in step 4S1 includes at least one of single-mode cavity modulation, photoelastic modulation, spatial light modulator modulation, mode converter modulation, birefringent device modulation and polarizer modulation.

Further, a method for modulating the phase and its range in step 4S1 includes at least one of phase shift modulation, birefringence device modulation and spatial light modulator modulation.

Further, a method for frequency matching in step 4S2 includes at least one of chromatic dispersion device modulation matching, filter device modulation matching, refraction device modulation matching, interference modulation matching, absorption modulation matching, nonlinear optical modulation matching and direct irradiation.

Further, a method for directing into the ionization area in step 4S3*a* includes at least one of refraction device modulation, transmission antenna modulation, matrix reflection device modulation, spatial light modulator modulation, variable curvature reflection device modulation, absorption device modulation and direct irradiation.

Further, feeding the second electromagnetic wave beam and subsequent electromagnetic waves to the ionization area of the target molecules on the surface of the material via a waveguide specifically includes the following steps: 4S1, modulating the wavelength and its range, spatial distribution, polarization and its range, orbital angular momentum and its range, phase and its range of the second and subsequent electromagnetic wave beams to obtain second and subsequent modulated electromagnetic wave beams; 4S2, guiding the second and subsequent modulated electromagnetic wave beams to match with the plasma frequency of the ionized target molecules, so as to obtain frequency-matched modulated electromagnetic waves; 4S3*b*, feeding the frequency-matched modulated electromagnetic waves into an isolator via the waveguide to obtain unidirectional frequency-matched modulated electromagnetic waves; and 4S4*b*, directing the unidirectional frequency-matched modulated electromagnetic waves onto the ionization area of the target molecules on the surface of the material via the waveguide, such that the ionized target molecules absorb the electromagnetic waves to improve the degree of ionization of the target molecules.

Further, the isolator in step 4S3*b* includes at least one of waveguide circulator, optical fiber waveguide circulator, optical fiber photoisolator, Faraday rotator, coaxial isolator, drop-in isolator, broadband isolator, two-section isolator, microstrip isolator, attenuator and load.

Further, a method for directing into the ionization area in step 4S4*b* includes at least one of refraction device modulation, transmission antenna modulation, matrix reflection device modulation, spatial light modulator modulation, variable curvature reflection device modulation, absorption device modulation, photonic crystal modulation, waveguide modulation irradiation and direct irradiation.

Further, releasing the target molecules in the form of bulk phase plasma specifically includes the following steps: 5S1, extracting plasma of the target molecules from the surface of the material to obtain delocalized plasma; and 5S2, confining the delocalized plasma in a specific space to obtain higher energy density.

Further, extracting from the surface of the material in step 5S1 includes at least one of vacuum suction, airflow delivery, negative pressure extraction, external grounding attraction, external electromagnetic wave source guidance and external current guidance.

Further, confining the plasma in step 5S2 includes at least one of confinement by an external magnetic field, self-pinching confinement by a magnetic field formed by grounding current, airflow confinement and collision confinement.

In another aspect, the present invention further provides a plasma device, where a plasma in the plasma device includes any one or more of the plasma mentioned above. The plasma device includes, but is not limited to, a sensor, a plasma source, a reactor, an antenna, a motor, etc.

The present invention provides a surface coupling induced ionization technique and a plasma corresponding thereto. The induced ionization technique excites surface plasma waves of a material by external electromagnetic waves, and through the adsorption of target molecules on a surface of the material, the bond energy of the target molecules is weakened, which is conducive to ionization. Further, after the target molecules are ionized, electromagnetic waves are fed in to maintain and enhance the ionization degree of the ionized molecules, forming stable plasma which is then extracted from the surface of the material, thus forming an atmospheric-pressure plasma source. By adopting different electromagnetic waves, different types of materials and different types of target molecules, various plasmas can be formed to meet various needs. This greatly reduces the difficulty of traditional direct ionization of target molecules by electromagnetic waves to form plasma. Even if the involved target molecules do not have the ability to absorb electromagnetic waves with a specific wavelength, the material can still induce the ionization of the target molecules by surface plasma through the adsorption of the target molecules on the material. By adjusting the power ratio between two electromagnetic wave beams, the energy feeding efficiency in the plasma can be maximized, thus forming a new plasma with an extremely wide range of electron temperature and ion temperature and extremely high energy density. The present invention also provides a plasma device related to the surface coupling induced ionization technique and the plasma corresponding thereto.

BENEFICIAL EFFECTS OF THE INVENTION

Beneficial Effects

Compared with the existing technique, the present invention provides a new way of formation of atmospheric-pressure plasma, which have very intuitive application value. Typical applications include exciting and observing suitable advanced excited states by a plasma torch, improving the spectral analysis accuracy of a traditional OES, and reaching a detection limit of ppt level or even higher; or realizing diamond coating under atmospheric pressure or preparation of other nano-powder materials; or treatment of waste gas and tail gas, so as to realize harmless treatment of organic waste gas; even the formation of high-energy proton beams for targeting, so as to realize a miniaturized neutron beam source, and the like.

To sum up, the present invention has the advantages that a wide range of molecules can be ionized, energy feeding efficiency is high, energy density is high and the range of electron temperature and ion temperature is wide, thus providing a reliable premise for expanding the application of plasmas.

BRIEF DESCRIPTION OF DRAWINGS

Description of Drawings

Figure 1:

FIG. 1 is an atmospheric-pressure nitrogen plasma torch formed according to the present invention.

Figure 2:
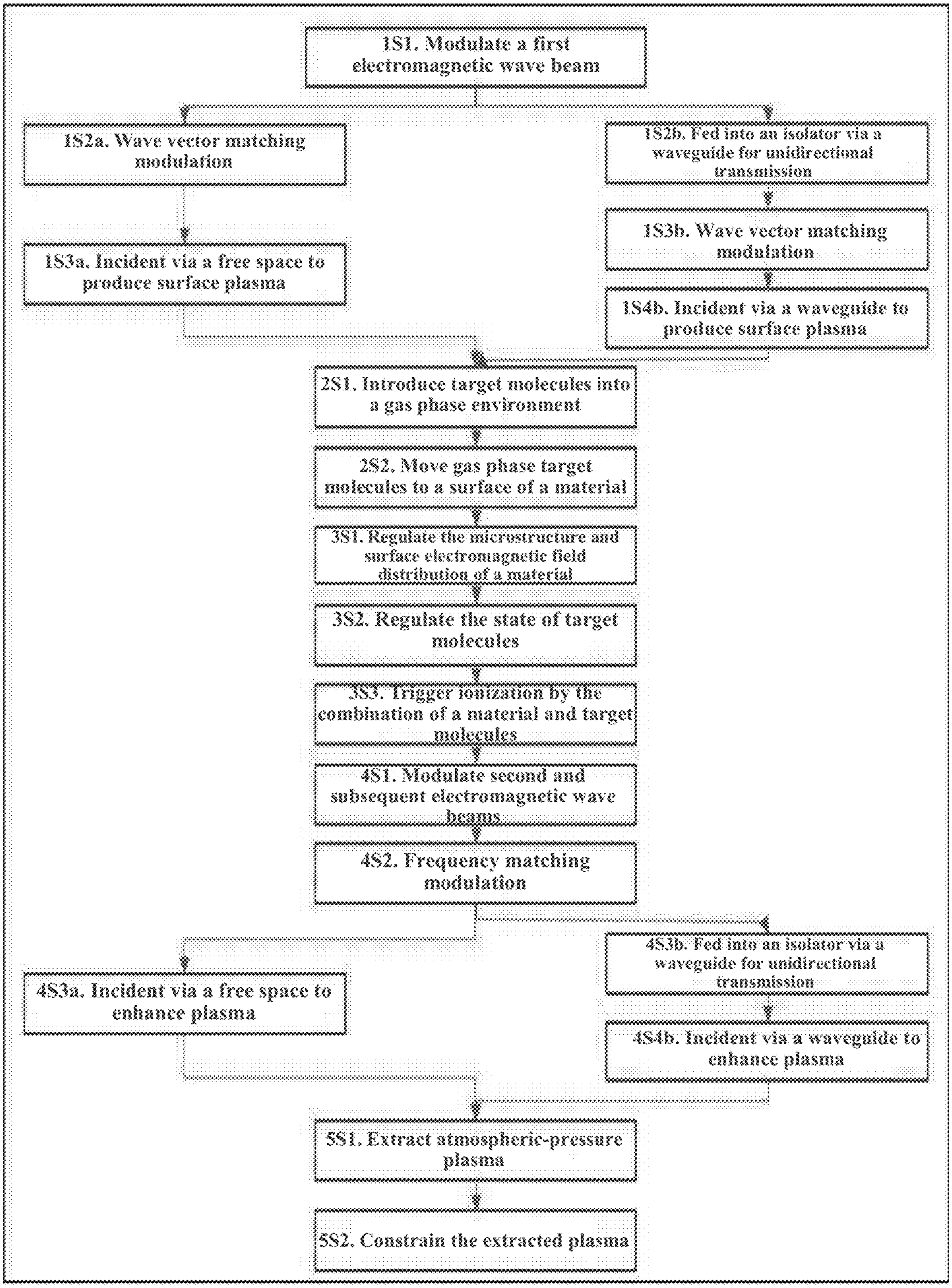

FIG. 2 is a flowchart of the implementation of the present invention.

DETAILED DESCRIPTION

Embodiments of the Present Invention

In order to make the objectives, technical schemes and advantages of the present invention more apparent, the present invention is further described in detail in conjunction with the accompanying drawings and embodiments. It should be understood that the specific embodiments described here are intended only to explain the present invention and are not intended to limit the present invention. It should be noted that the embodiments of the present invention and the features in the embodiments can be combined with each other without conflict.

The present invention provides a surface coupling induced ionization technique, and a plasma and plasma device corresponding thereto.

According to the surface coupling induced ionization technique of the present invention, through surface interaction between a material and target molecules, the target molecules are coupled with surface plasma on the material, thereby inducing the ionization of the target molecules and forming plasma.

Compared with the existing technique, the inventor of this application innovatively couples the surface plasma of the material with the interaction between the target molecules and the material caused by adsorption for the first time, and further enhances the ionization of the target molecules by electromagnetic waves, so that stable plasma can be formed. In this way, the difficulty of forming plasma by the target molecules is greatly reduced. Even if the involved target molecules do not have the ability to absorb electromagnetic waves with a specific wavelength, the material can still induce the ionization of the target molecules by surface plasma through the adsorption of the target molecules on the material.

Based on this inventive concept, the present invention selects a series of materials with different forms, sizes and types as an adsorption medium of the target molecules and a carrier of the surface plasma.

The material is in a solid form or a liquid form. Here, the solid form includes but is not limited to at least one of film, particle, powder, aerosol, photonic crystal and gas-solid two-phase flow; and the liquid form includes but is not limited to at least one of droplet, dispersion liquid and gas-liquid two-phase flow. Selecting materials with different forms is to provide different specific surface areas and microstructures, and further control additional wave vectors on the materials through forms, so as to excite surface plasmon waves more easily.

The material has a size of 0.3 nm-1000 mm, preferably 1 nm-100 μm. These sizes are selected mainly because in this size range, the surface plasmons are confined within a particle boundary of nanometer to submicron scale, resulting in great wave vector uncertainty. Therefore, the requirement for the incident angle of surface plasmon coupling is reduced, and wave vector matching is facilitated.

The material includes at least one of metal and alloy material, carbon material, ceramic material, organic conductor material and semiconductor material. Further, the carbon material includes at least one of non-defective graphene, highly-defective graphene, aminated graphene, carboxylated graphene, hydroxylated graphene, sulfhydrylated graphene, oxidized graphene, methylated graphene, trifluoromethylated graphene, octadecylated graphene, fluorinated graphene and iodinated graphene, artificial graphite, natural graphite, graphitized carbon microsphere, graphitized carbon nanotube, carbon nanotube, glassy carbon, amorphous carbon, carbon nanohorn, carbon fiber, carbon quantum dot and carbon molecular sieve. Such materials are selected mainly because of their different band gaps, which allow excitation under different excitation conditions. Moreover, such materials often have a good surface plasmon quality factor, and the formed surface plasmons can spread far, which will make the ionization probability of the target molecules higher.

According to the surface coupling induced ionization technique, a first electromagnetic wave beam is fed to a material via a free space or waveguide, such that the first electromagnetic wave beam resonates with surface plasma of the material and surface plasma waves are excited. At the same time, target molecules to be ionized are introduced to a surface of the material, and by controlling the interaction between the surface of the material and the target molecules, electrons of the target molecules are coupled with surface plasmons on the material to induce the ionization of the target molecules. Second and subsequent electromagnetic wave beams are fed to an ionization area of the target molecules on the surface of the material synchronously via the free space or waveguide, such that the ionized target molecules absorb the electromagnetic waves to improve the degree of ionization of the target molecules. Finally, the target molecules are released in the form of bulk phase plasma to realize surface coupling induced ionization.

Because waveguides can facilitate the isolation of incident electromagnetic waves and avoid damage to an electromagnetic wave source in the working process, it is preferable to introduce the first electromagnetic wave beam, and the second and subsequent electromagnetic wave beams via a waveguide. Specifically, it is realized by the following steps:

1S1, modulating the wavelength and its range, spatial distribution, polarization, orbital angular momentum and its range, phase and its range of the first electromagnetic wave beam to obtain a first modulated electromagnetic wave;

**1S2*b***, feeding the first modulated electromagnetic wave beam into an isolator via the waveguide to obtain a unidirectional first modulated electromagnetic wave beam;

**1S3*b***, guiding the unidirectional first modulated electromagnetic wave beam to be subjected to wave vector matching with surface plasma frequency of the material to obtain wave vector-matched unidirectional modulated electromagnetic waves; and

**1S4*b***, directing the wave vector-matched unidirectional modulated electromagnetic waves onto the surface of the material via the waveguide, such that surface plasma waves are formed on the surface of the material.

2S1, introducing the target molecules into a gas phase environment to obtain target molecules in a gas phase; and

2S2, moving the target molecules in the gas phase to the surface of the material.

3S1, controlling the microstructure of the material and surface electromagnetic field distribution to obtain a modulated material;

3S2, controlling the state of the target molecules to obtain modulated target molecules; and

3S3, combining the modulated material with the modulated target molecules to control the interaction between the surface of the material and the target molecules, and realize the ionization of the target molecules.

4S1, modulating the wavelength and its range, spatial distribution, polarization and its range, orbital angular momentum and its range, phase and its range of the second and subsequent electromagnetic wave beams to obtain second and subsequent modulated electromagnetic wave beams;

4S2, guiding the second and subsequent modulated electromagnetic wave beams to match with the plasma frequency of the ionized target molecules, so as to obtain frequency-matched modulated electromagnetic waves;

**4S3*b***, feeding the frequency-matched modulated electromagnetic waves into an isolator via the waveguide to obtain unidirectional frequency-matched modulated electromagnetic waves; and

**4S4*b***, directing the unidirectional frequency-matched modulated electromagnetic waves onto the ionization area of the target molecules on the surface of the material via the waveguide, such that the ionized target molecules absorb the electromagnetic waves to improve the degree of ionization of the target molecules.

5S1, extracting plasma of the target molecules from the surface of the material to obtain delocalized plasma; and

5S2, confining the delocalized plasma in a specific space to obtain higher energy density.

As for the characteristics of the incident electromagnetic wave source, ideally, no modulation is needed to reach the maximum power input, because modulation of any kind will cause power loss of the incident electromagnetic waves.

Therefore, through demand analysis of the beam, it can be known that:

the first electromagnetic wave beam is at least one of gamma-ray, hard X-ray, soft X-ray, extreme ultraviolet ray, near-ultraviolet ray, visible light, near-infrared ray, middle infrared ray, far infrared ray, terahertz wave, extremely-high frequency microwave, super-high frequency microwave, ultra-high frequency microwave, very high frequency radio wave, high frequency radio wave, intermediate frequency radio wave, low frequency radio wave, very low frequency radio wave, ultra-low frequency radio wave, and extremely-low frequency radio wave, preferably soft X-ray, extreme ultraviolet ray, near-ultraviolet ray, visible light, near-infrared ray, middle infrared ray, terahertz wave, extremely-high frequency microwave, super-high frequency microwave and ultra-high frequency microwave.

The first electromagnetic wave beam has a wavelength ranging from 0.01 nm to 100 km, preferably 10 nm to 1 m.

The spatial distribution of the first electromagnetic wave beam includes at least one of Gaussian beam, Bessel beam, Airy beam, Laguerre-Gaussian beam, Cosine-Gaussian beam, Mathieu beam, flat-topped beam and vortex beam, preferably Gaussian beam, Bessel beam, Laguerre-Gaussian beam and flat-topped beam.

The first electromagnetic wave beam has a degree of polarization of 0.01%-99%, preferably 90%-99%.

The polarization mode of the first electromagnetic wave beam includes at least one of natural light, partial polarization, linear polarization, circular polarization, elliptical polarization, azimuthal polarization and radial polarization, preferably linear polarization.

The polarization of the first electromagnetic wave beam includes S-wave polarization and P-wave polarization, preferably P-wave polarization.

The first electromagnetic wave beam has an orbital angular momentum ranging from −10 to +10, preferably ±1.

The first electromagnetic wave beam has a phase ranging from 0π to 2π.

The second and subsequent electromagnetic wave beams are at least one of gamma-ray, hard X-ray, soft X-ray, extreme ultraviolet ray, near-ultraviolet ray, visible light, near-infrared ray, middle infrared ray, far infrared ray, terahertz wave, extremely-high frequency microwave, super-high frequency microwave, ultra-high frequency microwave, very high frequency radio wave, high frequency radio wave, intermediate frequency radio wave, low frequency radio wave, very low frequency radio wave, ultra-low frequency radio wave, and extremely-low frequency radio wave, preferably near-infrared ray, middle infrared ray, far infrared ray, terahertz wave, extremely-high frequency microwave, super-high frequency microwave, ultra-high frequency microwave, very high frequency radio wave, high frequency radio wave, and intermediate frequency radio wave.

The second and subsequent electromagnetic wave beams have a wavelength ranging from 0.01 nm to 100 km, preferably 1 μm-1 km.

The spatial distribution of the second and subsequent electromagnetic wave beams includes at least one of Gaussian beam, Bessel beam, Airy beam, Laguerre-Gaussian beam, Cosine-Gaussian beam, Mathieu beam, flat-topped beam and vortex beam, preferably Gaussian beam and flat-topped beam.

The second and subsequent electromagnetic wave beams have a degree of polarization of 0.01%-99%, preferably 0.01%-0.1%.

The polarization mode of the second and subsequent electromagnetic wave beams includes at least one of natural light, partial polarization, linear polarization, circular polarization, elliptical polarization, azimuthal polarization and radial polarization, preferably natural light and partial polarization.

The polarization of the second and subsequent electromagnetic wave beams includes S-wave polarization and P-wave polarization.

The second and subsequent electromagnetic wave beams have an orbital angular momentum ranging from −10 to +10, preferably 0.

The second and subsequent electromagnetic wave beams have a phase ranging from 0π to 2π.

In addition, the inventors of the present application found that the electromagnetic wave absorption levels of the target molecules before and after ionization are quite different, so the electromagnetic waves needed before and after ionization are distinguished to ensure the maximum utilization rate of the fed electromagnetic waves. Wave beams used before ionization are required to have a specific wavelength and mode at a certain power, and energy should be concentrated as much as possible, while wave beams used after ionization are required to have as high a power as possible, so as to ensure that the process from ionization to the formation of bulk phase plasma can be completed as quickly as possible, and the excited state is high.

Therefore, through demand analysis of the beam, it can be known that:

a method for modulating the wavelength and its range in step 1S1 includes at least one of chromatic dispersion device modulation, filter device modulation, refraction device modulation, interference modulation, absorption modulation, nonlinear optical modulation and resonant cavity enhancement modulation, preferably interference modulation, absorption modulation, filter device modulation and resonant cavity enhancement modulation.

A method for modulating the spatial distribution in step 1S1 includes at least one of refraction device modulation, transmission antenna modulation, matrix reflection device modulation, spatial light modulator modulation, variable curvature reflection device modulation and absorption device modulation, preferably transmission antenna modulation, refraction device modulation and spatial light modulator modulation.

A method for modulating the polarization and the orbital angular momentum and its range in step 1S1 includes at least one of single-mode cavity modulation, photoelastic modulation, spatial light modulator modulation, mode converter modulation, birefringent device modulation and polarizer modulation, preferably single-mode cavity modulation, photoelastic modulation, spatial light modulator modulation and mode converter modulation.

A method for modulating the phase and its range in step 1S1 includes at least one of phase shift modulation, birefringence device modulation and spatial light modulator modulation, preferably spatial light modulator modulation.

The isolator in step 1S2*b* includes at least one of waveguide circulator, optical fiber waveguide circulator, optical fiber photoisolator, Faraday rotator, coaxial isolator, drop-in isolator, broadband isolator, two-section isolator, microstrip isolator, attenuator and load, preferably waveguide circulator, optical fiber waveguide circulator and optical fiber photoisolator.

A method for wave vector matching in step 1S3*b* includes using at least one of a grating, a photonic crystal waveguide, waveguide coupling prism total internal reflection, a metamaterial waveguide with dielectric constant less than 1, a multiple attenuation total internal reflection device, a waveguide total internal reflection device, a total internal reflection device, near-field waveguide probe irradiation with wavelength less than 1, and direct matching, preferably waveguide coupling prism total internal reflection, a multiple attenuation total internal reflection device, a waveguide total internal reflection device, a total internal reflection device, near-field waveguide probe irradiation with wavelength less than 1, and direct matching.

A method for modulating the wavelength and its range in step 4S1 includes at least one of chromatic dispersion device modulation, filter device modulation, refraction device modulation, interference modulation, absorption modulation, nonlinear optical modulation and resonant cavity enhancement modulation, preferably chromatic dispersion device modulation and filter device modulation.

A method for modulating the spatial distribution in step 4S1 includes at least one of refraction device modulation, transmission antenna modulation, matrix reflection device modulation, spatial light modulator modulation, variable curvature reflection device modulation and absorption device modulation, preferably transmission antenna modulation, variable curvature reflection device modulation and matrix reflection device modulation.

A method for modulating the polarization and the orbital angular momentum and its range in step 4S1 includes at least one of single-mode cavity modulation, photoelastic modulation, spatial light modulator modulation, mode converter modulation, birefringent device modulation and polarizer modulation, preferably spatial light modulator modulation and mode converter modulation.

A method for modulating the phase and its range in step 4S1 includes at least one of phase shift modulation, birefringence device modulation and spatial light modulator modulation, preferably phase shift modulation and spatial light modulator modulation.

A method for frequency matching in step 4S2 includes at least one of chromatic dispersion device modulation matching, filter device modulation matching, refraction device modulation matching, interference modulation matching, absorption modulation matching, nonlinear optical modulation matching and direct irradiation, preferably nonlinear optical modulation matching or direct irradiation.

Steps 2S1-2S2 are to gasify the target molecules to introduce the target molecules to the surface of the material and ionize the target molecules. When the target molecules are gas under normal temperature and pressure, the ionization efficiency is the highest. In addition, for gas molecules, gas that fails to be ionized can also serve as carrier gas to carry plasma, so gas molecules are preferred as the target molecules.

Accordingly, by analyzing the characteristics of the target molecules, it can be known that:

a method for introducing the target molecules into the gas phase environment in step 2S1 includes at least one of ultrasonic atomization, heating evaporation, vacuum gasification, direct gasification and airflow carrying, preferably direct gasification or airflow carrying.

Moving to the surface of the material in step 2S2 includes at least one of optical tweezers displacement, ultrasonic tweezers displacement, mechanical force displacement, airflow loading, vacuum suction displacement, probe traction displacement and magnetic force displacement, preferably airflow loading and vacuum suction displacement.

Further, The applicant of the present invention found that steps 3S1-3S3 involve regulating the interaction between the target molecules and the material, such that the target molecules can be ionized by the surface plasma on the surface of the material as much as possible. This process has a great influence on the coupling efficiency, and the stronger the interaction, the easier it is for the surface plasma on the surface of the material to cause ionization of the target molecules. Besides, the simpler the requirements for surface processing of the material and the regulation conditions of the target molecules, the easier it is to implement.

To sum up, the conditions required for regulating interaction should be:

controlling the microstructure of the material and surface electromagnetic field distribution in step 3S1 includes at least one of forming a nano-scale periodic microstructure on the surface of the material, forming a nano-scale aperiodic microstructure on the surface of the material, forming a micrometer-scale periodic microstructure on the surface of the material, forming a micrometer-scale aperiodic microstructure on the surface of the material, material surface functional group structure modulation, material surface defect state density structure modulation, material surface doping structure modulation, material crystal domain size modulation, material superlattice structure modulation, material surface voltage modulation, material surface electric field distribution modulation, material magnetic domain structure modulation, and material magnetic field modulation, preferably forming a nano-scale periodic microstructure on the surface of the material, forming a micrometer-scale periodic microstructure on the surface of the material, material surface defect state density structure modulation and material surface doping structure modulation.

Controlling the state of the target molecules in step 3S2 includes at least one of exciting the target molecules by electromagnetic waves to select different excited states, controlling the chemical potential of the target molecules on the material by concentration difference, charging the target molecules by electrostatic introduction, and magnetizing the target molecules by magnetic field introduction, preferably controlling the chemical potential of the target molecules on the material by concentration difference, and exciting the target molecules by electromagnetic waves to select different excited states.

Finally, in the process of extracting the plasma, when the target molecules are gas or carrier gas is used to extract the plasma, it is not hard to find that the most natural extraction mode and constraint mode are airflow delivery and airflow constraint. In some environments where it is desired to introduce the plasma into a vacuum chamber, the plasma can also be pumped into the vacuum chamber by vacuum suction. In addition, for the plasma, once a current is formed inside, a self-pinching magnetic field will be generated due to the magnetic effect of the current, which will constrain the plasma, and the plasma can also be guided by an external electromagnetic wave source to be further enhanced.

Therefore, for the plasma formed by extraction and confinement, the following should be met:

extracting from the surface of the material in step 5S1 includes at least one of vacuum suction, airflow delivery, negative pressure extraction, external grounding attraction, external electromagnetic wave source guidance and external current guidance, preferably vacuum suction, airflow delivery, external grounding attraction, and external electromagnetic wave source guidance.

Confining the plasma in step 5S2 includes at least one of confinement by an external magnetic field, self-pinching confinement by a magnetic field formed by grounding current, airflow confinement and collision confinement, preferably self-pinching confinement by a magnetic field formed by grounding current, airflow confinement, and collision confinement.

Compared with the traditional plasma forming process in which energy is directly fed to target molecules to be ionized by electromagnetic waves or in other ways, feeding energy to ionized target molecules by electromagnetic waves is much more efficient, which is mainly because when the frequency of the ionized target molecules matches the fed electromagnetic waves, the maximum absorption efficiency can be achieved by resonance. Further, in the traditional plasma formation process, the target molecules to be ionized often have no special absorption capacity for the fed electromagnetic waves, but by controlling the state of a material, the involved material can nearly fully absorb the fed electromagnetic waves. This makes plasma formation at the initial stage much easier using the present invention than the traditional method. To sum up, the present invention has the advantages that a wide range of molecules can be ionized, energy feeding efficiency is high, energy density is high and the range of electron temperature and ion temperature is wide.

Correspondingly, the present invention also provides a plasma device which includes the aforementioned plasma. As the plasma has the above advantages, the plasma device provided with the plasma also has the advantages that a wide range of molecules can be ionized, energy feeding efficiency is high, energy density is high and the range of electron temperature and ion temperature is wide.

The scheme of the present invention will be further explained with specific embodiments below.

Embodiment 1

A 1550 nm near-infrared Gaussian beam was used as the first electromagnetic wave beam, and the material used was 30 nm gold film, which was plated at an end of a 1550 nm optical fiber. The ionized target molecules were carbon monoxide. A 6 μm medium infrared Gaussian beam was used as the second electromagnetic wave beam.

1550 nm near-infrared laser was emitted by a laser device, which was a Gaussian beam with a degree of polarization of 98% and an orbital angular momentum of 0. After emission, the wavelength distribution of the beam was controlled by interference modulation, the spatial distribution was modulated by a refraction device, the polarization distribution was modulated by photoelastic modulation, and the phase was modulated by a spatial light modulator. After modulation, the beam was fed into an optical fiber photoisolator by using a polarization-maintaining optical fiber as a waveguide, and then surface plasma was formed on the surface of the gold film at the end of the optical fiber through the total internal reflection of the optical fiber waveguide.

Carbon monoxide was delivered by a steel cylinder and directly gasified to generate a carbon monoxide air stream, and then sent to the surface of the gold film by nitrogen which serves as carrier gas. The chemical potential was controlled by concentration difference, and crystal domain modulation was conducted to promote stronger interaction. Then carbon monoxide was adsorbed on the surface of the gold film, and further induced by the surface plasma on the surface of the gold film to be ionized.

6 μm mid-infrared laser was emitted by a laser device, which was a Gaussian beam with a degree of polarization of 90% and an orbital angular momentum of 0. After emission, the wavelength distribution of the beam was modulated by a filter, the space and phase distribution was modulated by a spatial light modulator, and the polarization was modulated by a mode converter. After modulation, the beam was fed into an optical fiber photoisolator by using a high-power optical fiber as a waveguide, and then directed into a carbon monoxide ionization area through the optical fiber to form carbon monoxide plasma.

Finally, through airflow delivery by using nitrogen as carrier gas and airflow confinement, stable atmospheric-pressure carbon monoxide plasma was formed.

Embodiment 2

A 405 nm Bessel beam was used as the first electromagnetic wave beam, and the material used was a 1 μm carbon nanotube, which was placed under a prism plane. The ionized target molecules are iodine molecules. A 32.75 cm microwave Gaussian beam was used as the second electromagnetic wave beam.

405 nm blue-violet light was emitted by an LED, which was a Bessel beam with a degree of polarization of 18% and an orbital angular momentum of 0. After emission, the wavelength distribution of the beam was controlled by a chromatic dispersion device, the spatial distribution was modulated by a matrix reflection device, the polarization distribution was modulated by a polarizer, and the phase was modulated by a birefringent device. After modulation, the beam was fed into an optical fiber waveguide circulator by using a quartz optical fiber as a waveguide, and then directed to the surface of the carbon nanotube through total internal reflection of a prism coupled to an end of the optical fiber, so as to form surface plasma.

Iodine molecules were delivered to the surface of the carbon nanotube by thermal evaporation with argon serving as carrier gas. The iodine molecules on the surface of carbon nanotubes were excited by electromagnetic waves, and the surface of the carbon nanotube was doped and modulated to promote stronger interaction. Then iodine molecules were adsorbed on the surface of carbon nanotube powder, and further induced by the surface plasma on the surface of the carbon nanotube powder to be ionized.

A 32.75 cm microwave was emitted from a 915 MHz microwave source through a waveguide, which was a Gaussian beam with a degree of polarization of 0.01% and an orbital angular momentum of 0. After emission, the wavelength distribution of the beam was controlled by resonant cavity enhancement modulation, the spatial distribution was controlled by transmission antenna modulation, the phase distribution was modulated by phase shift modulation, and the polarization was modulated by single-mode cavity modulation. After modulation, the beam was fed into a system through the waveguide, and then directly directed into an ionization area of the iodine molecules through the waveguide to form iodine plasma.

Finally, through airflow delivery by using argon as carrier gas and collision confinement, stable atmospheric-pressure carbon monoxide plasma was formed.

Embodiment 3

A 12.24 cm microwave Gaussian beam was used as the first electromagnetic wave beam, and the material used was 1 mm iron particles, which were placed on a plane. The ionized target molecules were oxygen. A 12.24 cm microwave Gaussian beam was used as the second electromagnetic wave beam.

A 12.24 cm microwave was emitted from a 2450 MHz microwave source through a waveguide, which was a Gaussian beam with a degree of polarization of 0.04% and an orbital angular momentum of 0. After emission, the wavelength distribution of the beam was controlled by absorption modulation, the spatial distribution was controlled by a variable curvature reflection device, the polarization distribution was modulated by a single-mode cavity, and the phase was modulated by phase shift. After modulation, the beam was fed into the iron particles on the plane via a free space, and after direct matching, directed to the surface of the iron particles to form surface plasma.

Oxygen was delivered by a steel cylinder, and was directly vaporized and sent to the surface of the iron particles. Air was used as carrier gas, the chemical potential was controlled by concentration difference, and voltage modulation was conducted on the surface of the material to promote stronger interaction. Then oxygen was adsorbed on the surface, and was further induced by the surface plasma on the surface of the iron particles to be ionized.

A 12.24 cm microwave was emitted from a 2450 MHz microwave source through a waveguide, which was a Gaussian beam with a degree of polarization of 0.04% and an orbital angular momentum of 0. After emission, the wavelength distribution of the beam was modulated by a filter, the spatial distribution was modulated by a transmission antenna, the phase distribution was modulated by a refraction device, and the polarization was modulated by a mode converter. After modulation, the beam was fed into a system via a free space, and then directed to an oxygen ionization area through interference modulation matching to form oxygen plasma.

Finally, through negative pressure pumping delivery and collision constraint, stable atmospheric-pressure oxygen plasma was formed.

Embodiment 4

A 365 nm near-ultraviolet Gaussian beam was used as the first electromagnetic wave beam, and the material used was 0.2 μm fluorinated graphene, which was placed on a plane. The ionized target molecules were nitrogen trifluoride. A 12.24 cm microwave flat-topped beam was used as the second electromagnetic wave beam.

365 nm near-ultraviolet laser was emitted by a laser device, which was a Gaussian beam with a degree of polarization of 92% and an orbital angular momentum of 0. After emission, the wavelength distribution of the beam was controlled by interference modulation, the spatial distribution was controlled by a spatial light modulator, the polarization distribution was modulated by a mode conversion modulator, and the phase was modulated by a birefringent device. After modulation, the beam was fed onto the plane via a free space and directed to the surface of graphene fluoride to form surface plasma.

Nitrogen trifluoride was delivered by a steel cylinder, and directly gasified to generate a nitrogen trifluoride air stream, which was sent to the surface of graphene fluoride by using nitrogen as carrier gas. Nitrogen trifluoride was charged by electrostatic introduction, and surface electric field distribution modulation was conducted on graphene fluoride to promote stronger interaction. Then nitrogen trifluoride was adsorbed on the surface, and was further induced by surface plasma on the surface of graphene fluoride to be ionized.

A 12.24 cm microwave was emitted from a 2450 MHz microwave source through a waveguide, which was a flat-top beam with a degree of polarization of 0.1% and an orbital angular momentum of 0. After emission, the wavelength distribution of the beam was controlled by resonant cavity enhancement modulation, the spatial distribution was controlled by matrix emission device modulation, the phase distribution was modulated by refraction device modulation, and the polarization was modulated by mode converter modulation. After modulation, the beam was fed into a system through a waveguide, and then directly directed into a nitrogen trifluoride ionization area through the waveguide to form nitrogen trifluoride plasma.

Finally, through negative pressure pumping delivery and airflow confinement, stable atmospheric-pressure nitrogen trifluoride plasma was formed.

Embodiment 5

A 980 nm near-infrared Gaussian beam was used as the first electromagnetic wave beam, and the material used was 10 μm glassy carbon, which was placed on a grating. The ionized target molecules were ammonia. A 1.064 μm near-infrared vortex beam was used as the second electromagnetic wave beam.

980 nm near-infrared light was emitted by a laser device, which was a Gaussian beam with a degree of polarization of 85% and an orbital angular momentum of 0. After emission, the wavelength distribution of the beam was modulated by a filter, the spatial distribution was modulated by a refractive device, the polarization distribution was modulated by a birefringent device, and. the phase was modulated by a spatial light modulator. After modulation, the beam was fed onto the grating via a free space and directed to the surface of glassy carbon to form surface plasma.

Ammonia was heated to be evaporated, and sent to the surface of glassy carbon by using ammonia as carrier gas, the target molecules were charged by electrostatic introduction, and a micron-scale periodic microstructure was formed on the surface of glassy carbon to promote stronger interaction. Then ammonia was adsorbed on the surface, and was further induced by the surface plasma on the surface of glassy carbon to be ionized.

1.064 μm near-infrared light was emitted by a laser device, which was a vortex beam with a degree of polarization of 91% and an orbital angular momentum of 1. After emission, the wavelength distribution was controlled by nonlinear optical modulation, the spatial distribution was modulated by a variable curvature reflection device, the phase distribution was modulated by a birefringence device, and the polarization was modulated by a spatial light modulator. After modulation, the beam was fed into a system via a free space, and then directed to an ammonia ionization area after being subjected to transmission antenna modulation, so as to form ammonia plasma.

Finally, through external grounding attraction delivery and self-pinching confinement by a magnetic field formed by grounding current, stable atmospheric-pressure ammonia plasma was formed.

Embodiment 6

A 265 nm near-ultraviolet Mathieu beam was used as the first electromagnetic wave beam, and the material used was 10 μm β-alumina powder, which was placed on the surface of a micro-scale waveguide. The ionized target molecules were water molecules. A 1.54 μm near-infrared Gaussian beam was used as the second electromagnetic wave beam.

265 extreme ultraviolet light was emitted by an LED, which was a Mathieu beam with a degree of polarization of 76% and an orbital angular momentum of 0.07%. After emission, the wavelength distribution was controlled by interference modulation, the spatial distribution was controlled by a spatial light modulator, the polarization distribution was modulated by a polarizer, and the phase was modulated by phase shift. After modulation, the beam was fed into a double-section isolator via a free space, and then through a multiple attenuation total internal reflection device, directed to the surface of β-alumina to form surface plasma.

The water molecules were sent to the surface of β-alumina through optical tweezers displacement, the target molecules were excited by electromagnetic waves, different excited states were selected, and voltage modulation was conducted on the surface of β-alumina to promote stronger interaction. Then water molecules were adsorbed on the surface, and were further induced by surface plasma on the surface of β-alumina to be ionized.

1.54 μm laser was emitted by an acetylene frequency stabilized laser device, which was a Gaussian beam with a degree of polarization of 2% and an orbital angular momentum of 1. After emission, the wavelength distribution was controlled by a chromatic dispersion device, the spatial distribution was controlled by a variable curvature emitting device, the phase distribution was modulated by photoelastic modulation, and the polarization was modulated by a spatial light modulator. After modulation, the beam was fed into a broadband isolator system by using a high-power optical fiber as a waveguide, and then directed into a water molecule ionization area through the regulation of the optical fiber waveguide to form water molecule plasma.

Finally, through external current-guided delivery and confinement by an external magnetic field, stable atmospheric-pressure water molecule plasma was formed.

Embodiment 7

A 10 nm soft X-ray Gaussian beam was used as the first electromagnetic wave beam, and the material used was a 30 nm perovskite quantum dot, which was placed on a micro-scale surface. The ionized target molecules were copper phthalocyanine. A 32.75 cm microwave Airy beam was used as the second electromagnetic wave beam.

A 10 nm soft X-ray was emitted by an X-ray tube, which was a Gaussian beam with a degree of polarization of 0.09% and an orbital angular momentum of 0. After emission, the wavelength distribution was controlled by absorption modulation, the spatial distribution was controlled by an absorption device, the polarization distribution was modulated by a birefringence device, and the phase was modulated by a birefringence device. After modulation, the beam was fed into an optical fiber waveguide circulator through a soft X-ray optical fiber waveguide, and then irradiated by a near-field waveguide probe smaller than the wavelength, and directed to the surface of the perovskite quantum dot to form surface plasma.

Through probe traction, copper phthalocyanine was sent to the surface of the perovskite quantum dot. The target molecules were excited by electromagnetic waves, different excited states were selected, and crystal domain size modulation was conducted on the material to promote stronger interaction. Then copper phthalocyanine was adsorbed on the surface of the perovskite quantum dot, and was further induced by surface plasma on the surface of perovskite to be ionized.

A 32.75 cm microwave was emitted by a 915 MHz microwave traveling-wave tube, which was an Airy beam with a degree of polarization of 0.5% and an orbital angular momentum of 0. After emission, the wavelength distribution of the beam was controlled by resonant cavity enhancement modulation, the spatial distribution was controlled by transmission antenna modulation, the phase distribution was modulated by phase shift modulation, and the polarization was modulated by single-mode cavity modulation. After modulation, the beam was fed into a system via a waveguide, and then directed to a copper phthalocyanine ionization area through transmission antenna modulation to form copper phthalocyanine plasma.

Finally, through external electromagnetic wave source guidance delivery and confinement by an external magnetic field, stable atmospheric-pressure copper phthalocyanine plasma was formed.

Embodiment 8

A 0.11 mm terahertz Gaussian beam was used as the first electromagnetic wave beam, and the material used was a PEDOT-PSS film with a thickness of 1 μm, which was placed inside a cavity. The ionized target molecules were acetaminophen. A 5.1 cm microwave Gaussian beam was used as the second electromagnetic wave beam.

A 0.11 mm THz wave was emitted by a 2.7 THz antenna, which was a Gaussian beam with a degree of polarization of 0.09% and an orbital angular momentum of 0. After emission, the wavelength distribution of the beam was modulated by a filter, the spatial distribution was modulated by a transmission antenna, the polarization distribution was modulated by a single-mode cavity, and the phase was modulated by phase shift. After modulation, the beam was fed into a single-mode cavity via a waveguide, and then directed to the surface of PEDOT-PSS through a metamaterial device with a dielectric constant less than 1 to form surface plasma.

Acetaminophen was atomized by ultrasonic and sent to the surface of PEDOT-PSS by ultrasonic tweezers. The target molecules were charged by electrostatic introduction, and functional group structure modulation was conducted on the surface of the material to promote stronger interaction. Then acetaminophen was adsorbed on the surface of PEDOT-PSS, and was further induced by the surface plasma on the surface of PEDOT-PSS to be ionized.

A 5.1 cm microwave was emitted by a 5.8 GHz microwave magnetron, which was a Gaussian beam with a degree of polarization of 1.1% and an orbital angular momentum of 0. After emission, the wavelength distribution of the beam was controlled by resonant cavity enhancement modulation, the spatial distribution was controlled by transmission antenna modulation, the phase distribution was modulated by phase shift modulation, and the polarization was modulated by single-mode cavity modulation. After modulation, the beam was fed into a system through a waveguide circulator, and then directed to an acetaminophen ionization area after being subjected to absorption device modulation, so as to form acetaminophen plasma.

Finally, through vacuum suction delivery and collision constraint, stable atmospheric-pressure acetaminophen plasma was formed.

Embodiment 9

A 13.4 nm extreme ultraviolet ray was used as the first electromagnetic wave beam, and the material used was 20 μm carbon fiber, which was placed inside a cavity. The ionized target molecules were nitrogen. A 100 m intermediate frequency radio wave was used as the second electromagnetic wave beam.

A 13.4 nm extreme ultraviolet ray was emitted by a plasma light source, which was a Gaussian beam with a degree of polarization of 0.01% and an orbital angular momentum of 0. After emission, the wavelength distribution of the beam was controlled by nonlinear optical modulation, the spatial distribution was controlled by a variable curvature reflection device, the polarization distribution was modulated by a single-mode cavity, and the phase was modulated by phase shift. After modulation, the beam was fed into the cavity via a free space, and after direct matching, directed to the surface of the carbon fiber to form surface plasma.

Nitrogen was delivered by a steel cylinder and directly gasified to generate a nitrogen stream, which was carried by airflow and sent to the surface of the carbon fiber. The chemical potential of the target molecules on the material was controlled by the concentration difference, and a micron-scale periodic microstructure was formed on the surface of the material to promote stronger interaction. Then nitrogen was adsorbed on the surface, and was further induced by the surface plasma on the surface of the carbon fiber to be ionized.

A 100 m medium frequency radio wave was emitted by an antenna, which was a Gaussian beam with a degree of polarization of 3.5% and an orbital angular momentum of 0. After emission, the wavelength distribution was controlled by interference modulation, the spatial distribution was modulated by a transmission antenna, the phase distribution was modulated by phase shift, and the polarization is modulated by a mode converter. After modulation, the beam was fed into a system via a waveguide, and then directed to a nitrogen ionization area after being subjected to filter device modulation, so as to form nitrogen plasma.

Finally, through vacuum suction delivery and airflow confinement, stable atmospheric-pressure nitrogen plasma was formed.

Embodiment 10

A 12.24 cm microwave Gaussian beam was used as the first electromagnetic wave beam, and the material used was 50 nm cerium oxide aerogel, which was placed on a flat plate. The ionized target molecules were nitrogen dioxide. A 100 m intermediate frequency radio wave was used as the second electromagnetic wave beam.

A 12.24 cm microwave was emitted by a 2450 MHz microwave source through a waveguide, which was a Gaussian beam with a degree of polarization of 0.04% and an orbital angular momentum of 0. After emission, the wavelength distribution of the beam was controlled by absorption modulation, the spatial distribution was controlled by a variable curvature reflection device, the polarization distribution was modulated by a single-mode cavity, and the phase was modulated by phase shift. After modulation, the beam was fed via a free space, and then through a multiple attenuation total internal reflection device, directed to the surface of cerium oxide aerogel to form surface plasma.

Nitrogen dioxide was delivered by a steel cylinder and directly gasified to generate a nitrogen dioxide stream, which was sent to the surface of cerium oxide aerogel by using nitrogen as carrier gas. The chemical potential of the target molecules on the material was controlled by concentration difference, and a nano-scale aperiodic microstructure was formed on the surface of the material to promote stronger interaction. Then nitrogen dioxide was adsorbed on the surface of cerium oxide aerogel, and was further induced by the surface plasma on the surface of cerium oxide to be ionized.

A 100 m medium frequency radio wave was emitted by an antenna, which was a Gaussian beam with a degree of polarization of 3.5% and an orbital angular momentum of 0. After emission, the wavelength distribution was controlled by interference modulation, the spatial distribution was modulated by a transmission antenna, the phase distribution was modulated by phase shift, and the polarization is modulated by a mode converter. After modulation, the beam was fed via the free space through the antenna, and then directed to a nitrogen dioxide ionization area after being subjected to filter device modulation, so as to form nitrogen dioxide plasma.

Finally, through airflow delivery and airflow confinement, stable atmospheric-pressure nitrogen dioxide plasma was formed.

The above are only preferred embodiments of the present invention, and are not intended to limit the present invention. Any modification, equivalent replacement, improvement, etc. made within the spirit and principle of the present invention shall fall within the scope of protection of the present invention.

What is claimed is:

1. A surface coupling induced ionization method, comprising the following steps:

(1) feeding a first electromagnetic wave beam to a material via a free space or waveguide, such that the first electromagnetic wave beam resonates with a plasma of the material to excite surface plasmons;

adsorbing target molecules to be ionized to the surface of the material; and controlling an interaction between the surface of the material and the target molecules, to make electrons of the target molecules couple with the surface plasmons on the material to induce an ionization of the target molecules; wherein the controlling step comprises the following steps: modulating a microstructure and a surface electromagnetic field distribution of the material to obtain a modulated material; modulating a state of the target molecules to obtain modulated target molecules; and coupling the surface plasmons on the modulated material with the electrons of the modulated target molecules to induce the ionization of the target molecules;

(2) feeding second and subsequent electromagnetic wave beams to an ionization area of the target molecules on the surface of the material via the free space or waveguide, such that the ionized target molecules absorb the electromagnetic waves to improve the degree of ionization of the target molecules to form a stable plasma; and (3) extracting the stable plasma from the surface of the material to form a plasma source;

wherein feeding the first electromagnetic wave beam to the material via a free space in step 1 specifically comprises the following steps:

1S1, modulating a wavelength and its range, spatial distribution, polarization, orbital angular momentum and its range, phase and its range of the first electromagnetic wave beam to obtain a first modulated electromagnetic wave;

1S2*a*, guiding the first modulated electromagnetic wave beam to be subjected to wave vector matching with surface plasma frequency of the material to obtain wave vector-matched modulated electromagnetic waves; and 1S3*a*, directing the wave vector-matched modulated electromagnetic waves onto the surface of the material via the free space, such that surface plasma waves are formed on the surface of the material.

2. The surface coupling induced ionization method of claim 1, wherein the material in step 1 is in a solid form or a liquid form; wherein the solid form comprises at least one of film, particle, powder, aerosol, photonic crystal and gas-solid two-phase flow; and the liquid form comprises at least one of droplet, dispersion liquid and gas-liquid two-phase flow.

3. The surface coupling induced ionization method of claim 1, wherein the material in step 1 has a size of 0.3 nm-1000 mm.

4. The surface coupling induced ionization method of claim 1, wherein the material in step 1 comprises one or a mixture of more than one of metal and alloy material, carbon material, ceramic material, organic conductor material and semiconductor material.

5. The surface coupling induced ionization method of claim 4, wherein the metal and alloy material in step 1 comprises metal or alloy containing at least one of lithium, beryllium, boron, carbon, sodium, magnesium, aluminum, silicon, phosphorus, sulfur, scandium, titanium, vanadium, chromium, manganese, iron, cobalt, nickel, copper, zinc, gallium, germanium, arsenic, rubidium, strontium, yttrium, zirconium, niobium, molybdenum, technetium, ruthenium, rhodium, palladium, silver, cadmium, indium, tin, antimony, tellurium, cesium, barium, hafnium, tantalum, tungsten, rhenium, osmium, iridium, platinum, gold, mercury, thallium, lead, bismuth, polonium, francium, radium, lanthanide elements and actinide elements.

6. The surface coupling induced ionization method of claim 4, wherein the ceramic material in step 1 comprises at least one of oxide ceramic, silicate ceramic, nitride ceramic, borate ceramic, phosphate ceramic, carbide ceramic, aluminate ceramic, germanate ceramic and titanate ceramic.

7. The surface coupling induced ionization method of claim 4, wherein the organic conductor material in step 1 comprises at least one of polyacetylene, polyarylacetylene, polypyrrole, polyaniline, polythiophene, polyphenylene sulfide, TTF-TCNQ, PEDOT-PSS, tetrathiafulvalene, polyfluorene, poly (p-phenylene), polyaromatic hydrocarbon and other compounds with a continuous conjugated skeleton.

8. The surface coupling induced ionization method of claim 4, wherein the semiconductor material in step 1 comprises at least one of III-V semiconductor, II-VI semiconductor, IV semiconductor, quantum dot semiconductor and perovskite semiconductor particle.

9. The surface coupling induced ionization method of claim 4, wherein the carbon material in step 1 comprises one or a mixture of more than one of graphene, aminated graphene, carboxylated graphene, hydroxylated graphene, sulfhydrylated graphene, oxidized graphene, methylated graphene, trifluoromethylated graphene, octadecylated graphene, fluorinated graphene and iodinated graphene, artificial graphite, natural graphite, graphitized carbon microsphere, graphitized carbon nanotube, carbon nanotube, glassy carbon, amorphous carbon, carbon nanohorn, carbon fiber, carbon quantum dot and carbon molecular sieve.

10. The surface coupling induced ionization method of claim 1, wherein the first electromagnetic wave beam in step 1 comprises at least one of gamma-ray, hard X-ray, soft X-ray, extreme ultraviolet ray, near-ultraviolet ray, visible light, near-infrared ray, middle infrared ray, far infrared ray, terahertz wave, extremely-high frequency microwave, super-high frequency microwave, ultra-high frequency microwave, very high frequency radio wave, high frequency radio wave, intermediate frequency radio wave, low frequency radio wave, very low frequency radio wave, ultra-low frequency radio wave, and extremely-low frequency radio wave.

11. The surface coupling induced ionization method of claim 1, wherein the first electromagnetic wave beam in step 1 has a wavelength ranging from 0.01 nm to 100 km.

12. The surface coupling induced ionization method of claim 1, wherein a spatial distribution of the first electromagnetic wave beam in step 1 comprises at least one of Gaussian beam, Bessel beam, Airy beam, Laguerre-Gaussian beam, Cosine-Gaussian beam, Mathieu beam, flat-topped beam and vortex beam.

13. The surface coupling induced ionization method of claim 1, wherein the first electromagnetic wave beam in step 1 has a degree of polarization of 0.01%-99%.

14. The surface coupling induced ionization method of claim 1, wherein a polarization mode of the first electromagnetic wave beam in step 1 comprises at least one of natural light, partial polarization, linear polarization, circular polarization, elliptical polarization, azimuthal polarization and radial polarization.

15. The surface coupling induced ionization method of claim 1, wherein a polarization of the first electromagnetic wave beam in step 1 comprises S-wave polarization and P-wave polarization.

16. The surface coupling induced ionization method of claim 1, wherein the first electromagnetic wave beam in step 1 has an orbital angular momentum ranging from −10 to +10.

17. The surface coupling induced ionization method of claim 1, wherein the first electromagnetic wave beam in step 1 has a phase ranging from $0\pi$ to $2\pi$.

18. The surface coupling induced ionization method of claim 1, wherein the second and subsequent electromagnetic wave beams in step 2 comprise at least one of gamma-ray, hard X-ray, soft X-ray, extreme ultraviolet ray, near-ultraviolet ray, visible light, near-infrared ray, middle infrared ray, far infrared ray, terahertz wave, extremely-high frequency microwave, super-high frequency microwave, ultra-high frequency microwave, very high frequency radio wave, high frequency radio wave, intermediate frequency radio wave, low frequency radio wave, very low frequency radio wave, ultra-low frequency radio wave, and extremely-low frequency radio wave.

19. The surface coupling induced ionization method of claim 1, wherein the second and subsequent electromagnetic wave beams in step 2 have a wavelength ranging from 0.01 nm to 100 km.

20. The surface coupling induced ionization method of claim 1, wherein a spatial distribution of the second and subsequent electromagnetic wave beams in step 2 comprises at least one of Gaussian beam, Bessel beam, Airy beam, Laguerre-Gaussian beam, Cosine-Gaussian beam, Mathieu beam, flat-topped beam and vortex beam.

21. The surface coupling induced ionization method of claim 1, wherein the second and subsequent electromagnetic wave beams in step 2 have a degree of polarization of 0.01%-99%.

22. The surface coupling induced ionization method of claim 1, wherein a polarization mode of the second and subsequent electromagnetic wave beams in step 2 comprises at least one of natural light, partial polarization, linear polarization, circular polarization, elliptical polarization, azimuthal polarization and radial polarization.

23. The surface coupling induced ionization method of claim 1, wherein a polarization of the second and subsequent electromagnetic wave beams in step 2 comprises S-wave polarization and P-wave polarization.

24. The surface coupling induced ionization method of claim 1, wherein the second and subsequent electromagnetic wave beams in step 2 have an orbital angular momentum ranging from −10 to +10.

25. The surface coupling induced ionization method of claim 1, wherein the second and subsequent electromagnetic wave beams in step 2 have a phase ranging from $0\pi$ to $2\pi$.

26. The surface coupling induced ionization method of claim 1, wherein any one of the target molecules in steps 1, 2 and 3 has a molecular weight ranging from $1.0\times10^{0}$ Da to $1.0\times10^{20}$ Da.

27. The surface coupling induced ionization method of claim 1, wherein a method for modulating the wavelength and its range in 1S1 of step 1 comprises at least one of chromatic dispersion device modulation, filter device modulation, refraction device modulation, interference modulation, absorption modulation, nonlinear optical modulation and resonant cavity enhancement modulation.

28. The surface coupling induced ionization method of claim 1, wherein a method for modulating the spatial distribution in 1S1 of step 1 comprises at least one of refraction device modulation, transmission antenna modulation, matrix reflection device modulation, spatial light modulator modulation, variable curvature reflection device modulation and absorption device modulation.

29. The surface coupling induced ionization method of claim 1, wherein a method for modulating the polarization and the orbital angular momentum and its range in 1S1 of step 1 comprises at least one of single-mode cavity modulation, photoelastic modulation, spatial light modulator modulation, mode converter modulation, birefringent device modulation and polarizer modulation.

30. The surface coupling induced ionization method of claim 1, wherein a method for modulating the phase and its range in 1S1 of step 1 comprises at least one of phase shift modulation, birefringence device modulation and spatial light modulator modulation.

31. The surface coupling induced ionization method of claim 1, wherein a method for modulating the phase and its range in 1S1 of step 1 comprises at least one of phase shift modulation, birefringence device modulation and spatial light modulator modulation.

32. The surface coupling induced ionization method of claim 1, wherein a method for wave vector matching in 1S2*a* of step 1 comprises using at least one of a grating, a photonic crystal, free optical coupling prism total internal reflection, a metamaterial device with dielectric constant less than 1, a multiple attenuation total internal reflection device, a free optical coupling waveguide total internal reflection device, a total internal reflection device, a focusing device and direct matching.

33. The surface coupling induced ionization method of claim 1, wherein adsorbing the target molecules to be ionized to the surface of the material in step 1 specifically comprises the following steps:

2S1, adsorbing the target molecules into a gas phase environment to obtain target molecules in a gas phase; and 2S2, moving the target molecules in the gas phase to the surface of the material.

34. The surface coupling induced ionization method of claim 33, wherein a method for adsorbing the target molecules into the gas phase environment in step 2S1 comprises at least one of ultrasonic atomization, heating evaporation, vacuum gasification, direct gasification and airflow carrying.

35. The surface coupling induced ionization method of claim 33, wherein, moving to the surface of the material in step 2S2 comprises at least one of optical tweezers displacement, ultrasonic tweezers displacement, mechanical force displacement, airflow loading, vacuum suction displacement, probe traction displacement and magnetic force displacement.

36. The surface coupling induced ionization method of claim 1, wherein controlling the microstructure of the material and surface electromagnetic field distribution in 3S1 of step 1 comprises at least one of forming a nano-scale periodic microstructure on the surface of the material, forming a nano-scale aperiodic microstructure on the surface of the material, forming a micrometer-scale periodic microstructure on the surface of the material, forming a micrometer-scale aperiodic microstructure on the surface of the material, material surface functional group structure modulation, material surface defect state density structure modulation, material surface doping structure modulation, material crystal domain size modulation, material superlattice structure modulation, material surface voltage modulation, material surface electric field distribution modulation, material magnetic domain structure modulation, and material magnetic field modulation.

37. The surface coupling induced ionization method of claim 1, wherein controlling the state of the target molecules in 3S2 of step 1 comprises at least one of exciting the target molecules by electromagnetic waves to select different excited states, controlling the chemical potential of the target molecules on the material by concentration difference, charging the target molecules by electrostatic introduction, and magnetizing the target molecules by magnetic field introduction.

38. The surface coupling induced ionization method of claim 1, wherein feeding the second and subsequent electromagnetic wave beams to the ionization area of the target molecules on the surface of the material via a free space in step 2 specifically comprises the following steps:

4S1, modulating the wavelength and its range, spatial distribution, polarization, orbital angular momentum and its range, phase and its range of the second and subsequent electromagnetic wave beams to obtain second and subsequent modulated electromagnetic wave beams;

4S2, guiding the second and subsequent modulated electromagnetic wave beams to match with the plasma frequency of the ionized target molecules, so as to obtain frequency-matched modulated electromagnetic waves;

4S3*a*, directing the frequency-matched modulated electromagnetic waves onto the ionization area of the target molecules on the surface of the material via the free space, such that the ionized target molecules absorb the electromagnetic waves to improve the degree of ionization of the target molecules.

39. The surface coupling induced ionization method of claim 28, wherein in terms of feeding the second and subsequent electromagnetic wave beams to the ionization area of the target molecules on the surface of the material via a free space in step 2, a method for modulating the wavelength and its range in step 4S1 comprises at least one of chromatic dispersion device modulation, filter device modulation, refraction device modulation, interference modulation, absorption modulation, nonlinear optical modulation and resonant cavity enhancement modulation.

40. The surface coupling induced ionization method of claim 38, wherein in terms of feeding the second and subsequent electromagnetic wave beams to the ionization area of the target molecules on the surface of the material via a free space in step 2, a method for modulating the spatial distribution in step 4S1 comprises at least one of refraction device modulation, transmission antenna modulation, matrix reflection device modulation, spatial light modulator modulation, variable curvature reflection device modulation and absorption device modulation.

41. The surface coupling induced ionization method of claim 38, wherein in terms of feeding the second and subsequent electromagnetic wave beams to the ionization area of the target molecules on the surface of the material via a free space in step 2, a method for modulating the polarization and the orbital angular momentum and its range in step 4S1 comprises at least one of single-mode cavity modulation, photoelastic modulation, spatial light modulator modulation, mode converter modulation, birefringent device modulation and polarizer modulation.

42. The surface coupling induced ionization method of claim 38, wherein in terms of feeding the second and subsequent electromagnetic wave beams to the ionization area of the target molecules on the surface of the material via a free space in step 2, a method for modulating the phase and its range in step 4S1 comprises at least one of phase shift modulation, birefringence device modulation and spatial light modulator modulation.

43. The surface coupling induced ionization method of claim 38, wherein in terms of feeding the second and subsequent electromagnetic wave beams to the ionization area of the target molecules on the surface of the material via a free space in step 2, a method for frequency matching in step 4S2 comprises at least one of chromatic dispersion device modulation matching, filter device modulation matching, refraction device modulation matching, interference modulation matching, absorption modulation matching, nonlinear optical modulation matching and direct irradiation.

44. The surface coupling induced ionization method of claim 38, wherein in terms of feeding the second and subsequent electromagnetic wave beams to the ionization area of the target molecules on the surface of the material via a free space in step 2, a method for directing into the ionization area in step **4S3*a*** comprises at least one of refraction device modulation, transmission antenna modulation, matrix reflection device modulation, spatial light modulator modulation, variable curvature reflection device modulation, absorption device modulation and direct irradiation.

45. The surface coupling induced ionization method of claim 1, wherein feeding the second electromagnetic wave beam and subsequent electromagnetic waves to the ionization area of the target molecules on the surface of the material via a waveguide in step 2 specifically comprises the following steps:

4S1, modulating the wavelength and its range, spatial distribution, polarization and its range, orbital angular momentum and its range, phase and its range of the second and subsequent electromagnetic wave beams to obtain second and subsequent modulated electromagnetic wave beams;

4S2, guiding the second and subsequent modulated electromagnetic wave beams to match with the plasma frequency of the ionized target molecules, so as to obtain frequency-matched modulated electromagnetic waves;

4S3*b*, feeding the frequency-matched modulated electromagnetic waves into an isolator via the waveguide to obtain unidirectional frequency-matched modulated electromagnetic waves; and 4S4*b*, directing the unidirectional frequency-matched modulated electromagnetic waves onto the ionization area of the target molecules on the surface of the material via the waveguide, such that the ionized target molecules absorb the electromagnetic waves to improve the degree of ionization of the target molecules.

46. The surface coupling induced ionization method of claim 45, wherein in terms of feeding the second and subsequent electromagnetic wave beams to the ionization area of the target molecules on the surface of the material via a free space in step 2, a method for modulating the wavelength and its range in step 4S1 comprises at least one of chromatic dispersion device modulation, filter device modulation, refraction device modulation, interference modulation, absorption modulation, nonlinear optical modulation and resonant cavity enhancement modulation.

47. The surface coupling induced ionization method of claim 45, wherein in terms of feeding the second and subsequent electromagnetic wave beams to the ionization area of the target molecules on the surface of the material via a free space in step 2, a method for modulating the spatial distribution in step 4S1 comprises at least one of refraction device modulation, transmission antenna modulation, matrix reflection device modulation, spatial light modulator modulation, variable curvature reflection device modulation and absorption device modulation.

48. The surface coupling induced ionization method of claim 45, wherein in terms of feeding the second and subsequent electromagnetic wave beams to the ionization area of the target molecules on the surface of the material via a free space in step 2, a method for modulating the polarization and the orbital angular momentum and its range in step 4S1 comprises at least one of single-mode cavity modulation, photoelastic modulation, spatial light modulator modulation, mode converter modulation, birefringent device modulation and polarizer modulation.

49. The surface coupling induced ionization method of claim 45, wherein in terms of feeding the second and subsequent electromagnetic wave beams to the ionization area of the target molecules on the surface of the material via a free space in step 2, a method for modulating the phase and its range in step 4S1 comprises at least one of phase shift modulation, birefringence device modulation and spatial light modulator modulation.

50. The surface coupling induced ionization method of claim 45, wherein in terms of feeding the second and subsequent electromagnetic wave beams to the ionization area of the target molecules on the surface of the material via a free space in step 2, the isolator in step **4S3*b*** comprises at least one of waveguide circulator, optical fiber waveguide circulator, optical fiber photoisolator, Faraday rotator, coaxial isolator, drop-in isolator, broadband isolator, two-section isolator, microstrip isolator, attenuator and load.

51. The surface coupling induced ionization method of claim 45, wherein in terms of feeding the second and subsequent electromagnetic wave beams to the ionization area of the target molecules on the surface of the material via a free space in step 2, a method for directing into the ionization area in step **4S4*b*** comprises at least one of refraction device modulation, transmission antenna modulation, matrix reflection device modulation, spatial light modulator modulation, variable curvature reflection device modulation, absorption device modulation, photonic crystal modulation, waveguide modulation irradiation and direct irradiation.

52. The surface coupling induced ionization method of claim 1, wherein extracting the stable plasma from the surface of the material to form a plasma source in step 3 specifically comprises the following steps:

5S1, extracting plasma of the target molecules from the surface of the material to obtain delocalized plasma; and 5S2, confining the delocalized plasma in a specific space to obtain higher energy density.

53. The surface coupling induced ionization method of claim 52, wherein, extracting plasma of the target molecules from the surface of the material in step 5S1 comprises at least one of vacuum suction, airflow delivery, negative pressure extraction, external grounding attraction, external electromagnetic wave source guidance and external current guidance.

54. The surface coupling induced ionization method of claim 52, wherein, confining the delocalized plasma in step 5S2 comprises at least one of confinement by an external magnetic field, self-pinching confinement by a magnetic field formed by grounding current, airflow confinement and collision confinement.

55. A plasma device, comprising the plasma source of claim 1.

56. A surface coupling induced ionization method, comprising the following steps:

(1) feeding a first electromagnetic wave beam to a material via a free space or waveguide, such that the first electromagnetic wave beam resonates with a surface of the material to excite surface plasmons;

adsorbing target molecules to be ionized to the surface of the material; and controlling an interaction between the surface of the material and the target molecules, to make electrons of the target molecules couple with the surface plasmons on the material to induce an ionization of the target molecules; wherein the controlling step comprises the following steps: modulating a microstructure and a surface electromagnetic field distribution of the material to obtain a modulated material; modulating a state of the target molecules to obtain modulated target molecules; and coupling the surface plasmons on the modulated material with the electrons of the modulated target molecules to induce the ionization of the target molecules;

(2) feeding second and subsequent electromagnetic wave beams to an ionization area of the target molecules on the surface of the material via the free space or waveguide, such that the ionized target molecules absorb the electromagnetic waves to improve the degree of ionization of the target molecules to form a stable plasma; and (3) extracting the stable plasma from the surface of the material to form a plasma source;

wherein feeding the first electromagnetic wave beam to the material via a waveguide in step 1 specifically comprises the following steps:

1S1, modulating a wavelength and its range, spatial distribution, polarization, orbital angular momentum and its range, phase and its range of the first electromagnetic wave beam to obtain a first modulated electromagnetic wave;

**1S2*b***, feeding the first modulated electromagnetic wave beam into an isolator via the waveguide to obtain a unidirectional first modulated electromagnetic wave beam;

**1S3*b***, guiding the unidirectional first modulated electromagnetic wave beam to be subjected to wave vector matching with surface plasma frequency of the material to obtain wave vector-matched unidirectional modulated electromagnetic waves; and

**1S4*b***, directing the wave vector-matched unidirectional modulated electromagnetic waves onto the surface of the material via the waveguide, such that surface plasma waves are formed on the surface of the material.

57. The surface coupling induced ionization method of claim 56, wherein in terms of feeding the first electromagnetic wave beam to the material via a waveguide in step 1, the isolator in step **1S2*b*** comprises at least one of waveguide circulator, optical fiber waveguide circulator, optical fiber photoisolator, Faraday rotator, coaxial isolator, drop-in isolator, broadband isolator, two-section isolator, microstrip isolator, attenuator and load.

58. The surface coupling induced ionization method of claim 56, wherein in terms of feeding the first electromagnetic wave beam to the material via a waveguide in step 1, a method for wave vector matching in step **1S3*b*** comprises using at least one of a grating, a photonic crystal waveguide, waveguide coupling prism total internal reflection, a metamaterial waveguide with dielectric constant less than 1, a multiple attenuation total internal reflection device, a waveguide total internal reflection device, a total internal reflection device, near-field waveguide probe irradiation with wavelength less than 1, and direct matching.

59. A surface coupling induced ionization method, comprising the following steps:

(1) feeding a first electromagnetic wave beam to a material via a free space or waveguide, such that the first electromagnetic wave beam resonates with a surface of the material to excite surface plasmons;

adsorbing target molecules to be ionized to the surface of the material; and controlling an interaction between the surface of the material and the target molecules, to make electrons of the target molecules couple with the surface plasmons on the material to induce an ionization of the target molecules; wherein the controlling step comprises the following steps: modulating a microstructure and a surface electromagnetic field distribution of the material to obtain a modulated material; modulating a state of the target molecules to obtain modulated target molecules; and coupling the surface plasmons on the modulated material with the electrons of the modulated target molecules to induce the ionization of the target molecules;

(2) feeding second and subsequent electromagnetic wave beams to an ionization area of the target molecules on the surface of the material via the free space or waveguide, such that the ionized target molecules absorb the electromagnetic waves to improve the degree of ionization of the target molecules to form a stable plasma; and extracting the stable plasma from the surface of the material to form a plasma (3) source;

wherein adsorbing the target molecules to be ionized to the surface of the material in step 1 specifically comprises the following steps:

2S1, adsorbing the target molecules into a gas phase environment to obtain target molecules in a gas phase; and

2S2, moving the target molecules in the gas phase to the surface of the material.

* * * * *